Dec. 30, 1969 R. C. CAMP 3,487,388

VARIABLE RELUCTANCE HEAD

Filed Dec. 28, 1965

INVENTOR:
ROGER C. CAMP
BY
Dawson, Tilton, Fallon, Lungmus & Alexander,
ATT'YS

United States Patent Office 3,487,388
Patented Dec. 30, 1969

3,487,388

VARIABLE RELUCTANCE HEAD

Roger C. Camp, Ames, Iowa, assignor to Iowa State University Research Foundation, Inc., Ames, Iowa, a corporation of Iowa Filed Dec. 28, 1965, Ser. No. 516,912
Int. Cl. G11b *5/00*
U.S. Cl. 340—174.1 4 Claims

ABSTRACT OF THE DISCLOSURE

A variable reluctance head is used for both reading and writing on magnetic recording material. An embodiment is described wherein the head is a unitary body formed into the shape of a W and having at least a ferromagnetic exterior. The lower jointed portions of the head are disposed adjacent the recording material; and a loop or coil encompasses at least one of the interior legs of the W for writing. Interrogate or read current is transmitted longitudinally through the head to saturate it thereby switching the flux path established in the inner legs by the record to generate a read signal having a phase indicative of the direction of magnification of the record. The switching of this flux is detected by the same loop used to write; but the saturated flux path caused by the interrogate current is in a plane parallel to the loop and it therefore does not affect the read signal.

This invention relates to variable reluctance head, and, more particularly, to a head for use in both reading and writing magnetically recorded information.

The reluctance head of this invention is an improvement over that shown and described in my copending application Ser. No. 192,419, filed May 4, 1962, now U.S. Patent 3,233,230. The head shown in that application and those of the prior art are characterized by a drawback in that the remanent magnetization from writing interferes with the Read function. Thus, to avoid observing a Read voltage, it has been the practice to utilize two heads and the avoidance of this and the problem in general constitute an object of invention. Other objects and advantages of the invention may be seen in the details of construction and operation set down in this specification.

The invention is described in conjunction with the accompanying drawing, in which.

Figure 1:
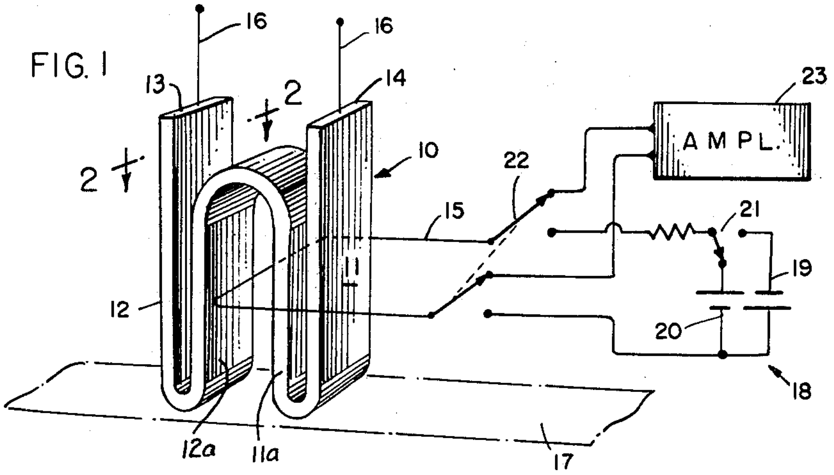
FIG. 1 is a perspective elevational view, partly schematic, of a head and apparatus used in the practice of the invention.

In FIG. 1 the numeral 10 designates the inventive head and is seen to include a unitary body 10 which has generally a W configuration. The body 10 includes first and second outer legs 11 and 12 together with first and second inner legs 11*a* and 12*a*, the upper extremities of outer legs 11 and 12 defining ends 13 and 14. The numeral 15 designates a read-write winding while the numeral 16 designates connections for interrogate current. The numeral 17 designates a magnetic recording means such as a tape which is adapted by means not shown to pass beneath the pole pieces of the body 10.

The numeral 18 designates generally the writing means and includes power sources 19 and 20 (represented as batteries) which are oppositely disposed and thus enable to apply opposite digital information to the tape, i.e., 1 or 0. The numeral 21 designates a switch so as to couple alternatively the sources 19 and 20 to the winding 15.

Still referring to FIG. 1, the numeral 22 designates a read-write switch adapted to couple the winding 15 alternatively to the writing means 18 or the reading means 23 which is shown to be an amplifier and which, as in the preceding application, may be a parametron, i.e., a phase sensitive amplifier.

The principle of operation is that the pole tips (the lower extremities of the legs 11 and 12) are located over the magnetic record 17 which as indicated previously takes the form of a dipole. By passing current in the appropriate direction through the write winding, a dipole of the proper direction can be established on the magnetic recording surface. For reading, a curent of either polarity, and sufficiently large to saturate the magnetic material of the head is passed between the ends 13 and 14 via the interrogate connections 16. Since no net flux established by the interrogate is enclosed by the read winding, no voltage will be induced from that source. However, a flux due to the record will be induced in the inner loop of the head between the pole tips, and as the path is saturated, a net change in flux will occur inducing a voltage in the read winding. It will be seen that the voltage in the read winding will be in one of two phases differing by 180° and have a magnitude directly proportional to the magnitude of the flux induced in the head by the record. The head can be made of a strip of diamagnetic material formed in the configuration of FIG. 1.

Figure 2:
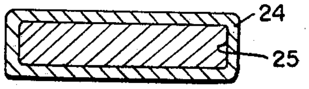
FIG. 2 is an enlarged sectional view taken along the line 2—2 of FIG. 1.

Superior results are obtained if, instead of using a completely ferromagnetic strip as indicated above, an anti-ferromagnetic core is used which is ensheathed with ferromagnetic material as shown in FIG. 2. There, the core 24 is copper while the sheath 25 is of ferromagnetic material. This is advantageous since the remanence of the head after writing will not bias future reading. With a sheath or coating, either by plating or evaporative deposition results in a ferromagnetic cross-section which is completely saturated. In one embodiment of the invention, the head used was made of a strip of Hypersil approximately 2 x 42 x 235 mils. The read-write winding was 10 turns of approximately No. 32 enameled copper wire. Using an external magnet to represent the record, voltage of 80 millivolts peak to peak were observed.

Figure 3:
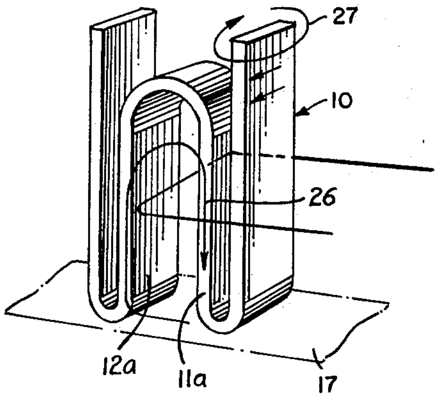
FIG. 3 is a reduced scale perspective view showing the flux patterns developed in the inventive head.

More particularly, in the operation of the inventive device the remanent flux density from a previous write operation will be in the longitudinal direction between the two pole tips along the inner path. The magnetic domain in the tape beneath the head exists in one of two directions and the magnetomotive force characteristic of the dipole information on the tape establishes the flux pattern shown in FIG. 3 and indicated by the looped arrow designated 26 for a direction of magnetization on the tape 17 proceeding right to left therein. It will be observed that the flux loop thus formed exists only on the two inner legs of the W-shaped head designated in FIG. 3 by reference numerals 11*a* and 12*a* and that this flux pattern has a component in either vertical direction depending upon and caused by the direction of the magnetization of the tape 17. The flux thus established can be sensed by the read winding and a false signal developed. However, with the introduction of current through the interrogate connection 16, a circumferential flux pattern 27 is set up which cancels out the flux pattern 26, the pattern having both horizontal components given in the illustration in FIG. 3—as at 27. That is, the interrogate current establishes a saturated flux pattern which has a circumferential or peripheral orientation relative to the body 10. It will be observed that this flux pattern in the inner leg 11*a* is in the same plane as (i.e. parallel to) the read/write current loop 15. Thus, there is no flux linking of this loop so that the interrogate current does not generate a voltage on the read winding. The interrogate current, however, does switch the flux pattern in the inner legs caused by the remanent magnetization of the tape 17 so that the read current generates an output signal which has a polarity dependent upon this remanent magnetization in the tape 17.

As indicated previously, I find it advantageous to use the laminated construction since the important flux occurs in the high reluctance exterior of the body. The current instrumental in developing this flux at lower frequencies flows primarily through the core and thus the low resistance non-magnetic copper core is advantageous.

While in the foregoing specification, a detailed description of the invention has been set down for the purpose of explanation, many variations in the details herein give may be made by those skilled in the art without departing from the spirit and scope of the invention.

I claim:

1. A variable reluctance head for use in reading and writing digital information on a magnetic recording material comprising a unitary body having at least a ferromagnetic exterior and defining first and second pole pieces, said pole pieces adapted for placement adjacent said recording material, read/write conductive means forming a loop encompassing said body to magnetize said pole pieces in opposite polarity when carrying a write current thereby to magnetize said recording material in a direction according to the polarity of said write current, and interrogate conductive means for coupling interrogate current through said body to saturate said body in a circumferential flux pattern and to switch the flux pattern caused by said recording material thereby to generate a signal in said read/write conductive means indicative of the flux direction in said recording material.

2. The head of claim 1 wherein said body comprises a non-ferromagnetic core of high conductivity for receiving said interrogate current and a ferromagnetic sheath completely encompassing said core except for its ends.

3. The head of claim 1 wherein said body defines a generally W-shape with first and second outer legs and first and second inner legs, the intersections between said outer and inner legs defining said pole pieces, said interrogate conductive means connected to the ends of said outer legs, and said read/write conductive means encompassing only one of said inner legs whereby the magnetic path for writing is formed in said inner legs.

4. In combination with the head of claim 1, a source of write current, a phase-sensitive read amplifier, and means for selectively coupling one of said source and said amplifier to said read/write conductive means.

References Cited

UNITED STATES PATENTS

| | | | |
|---|---|---|---|
| 2,479,308 | 8/1949 | Camras | 179—100.2 |
| 2,532,100 | 11/1950 | Howell | 179—100.2 |
| 2,536,272 | 1/1951 | Friend | 179—100.2 |
| 3,157,748 | 11/1964 | Eldredge | 340—174.1 |
| 3,349,382 | 10/1967 | Naylor et al. | 340—174.1 |

BERNARD KONICK, Primary Examiner

V. P. CANNEY, Assistant Examiner

U.S. Cl. X.R.

179—100.2